United States Patent [19]

Komori et al.

[11] Patent Number: 5,218,706

[45] Date of Patent: Jun. 8, 1993

[54] DATA FLOW PROCESSOR WITH NEXT DESTINATION NODE DETERMINATION

[75] Inventors: Shinji Komori; Hirono Tsubota, both of Itami; Kenji Shima, Amagasaki, all of Japan

[73] Assignee: Mitsubishi Denki Kabushiki Kaisha, Tokyo, Japan

[21] Appl. No.: 450,653

[22] Filed: Dec. 13, 1989

[30] Foreign Application Priority Data

Dec. 19, 1988 [JP] Japan ................................ 63-321574
Jan. 26, 1989 [JP] Japan ................................ 1-19256

[51] Int. Cl.⁵ .............................................. G06F 15/82
[52] U.S. Cl. ................................... 395/775; 395/375; 395/800; 364/DIG. 1; 364/232.22
[58] Field of Search .............. 364/DIG. 1, DIG. 2; 395/375, 650, 800, 775

[56] References Cited

U.S. PATENT DOCUMENTS

| | | | |
|---|---|---|---|
| 3,962,706 | 6/1976 | Dennis et al. | 395/650 |
| 4,145,733 | 3/1979 | Misunas et al. | 395/650 |
| 4,153,932 | 5/1979 | Dennis et al. | 395/800 |
| 4,809,159 | 2/1989 | Sowa | 395/800 |
| 4,814,978 | 3/1989 | Dennis | 395/375 |
| 4,893,234 | 1/1990 | Davidson et al. | 395/800 |
| 4,964,042 | 10/1990 | Sterling et al. | 395/200 |
| 5,043,880 | 8/1991 | Yoshida | 395/325 |
| 5,093,919 | 3/1992 | Yoshida et al. | 395/800 |

OTHER PUBLICATIONS

Ralston et al, "The Encyclopedia of Computer Science & Engineering", 1983 p. 17.
"An Architecture of a Data Flow Machine and Its Evaluation" pp. 486–490, T. Shimada et al. ('84).

Primary Examiner—David L. Clark
Assistant Examiner—John Loomis
Attorney, Agent, or Firm—Townsend and Townsend

[57] ABSTRACT

A data flow processor which is so constructed that the destination node number in a program memory is stored at a relative address from, for example, a stored address of the present instruction, and a storing address for the next instruction is obtained by adding the relative address of the next instruction to the address of the present instruction. Hence, an amount of data of storing address of instruction to be executed next executed and included in the respective instructions is reduced, whereby an amount of hardware at the program memory is reduced and the memory access time is contracted.

5 Claims, 9 Drawing Sheets

| ADDRESS | EXT (11) | COPY (10) | OPCODE (9 8 7 6) | RNODE (5 4 3 2 1 0) |
|---|---|---|---|---|
| 0 | 0 | 0 | * | 0 0 0 0 1 0 |
| 1 | 0 | 0 | * | 0 0 0 1 0 0 |
| 2 | 0 | 1 | + | 0 0 0 1 0 0 |
| 3 | 1 | 0 | + | 1 1 0 1 1 1 |
| 4 | 0 | 0 | 0 0 1 | 1 0 1 1 0 |
| 5 | 0 | 0 | * | 0 0 0 0 0 1 |
| 6 | 0 | 0 | + | 0 0 0 0 0 1 |
| ⋮ | | | | |
| 7096 | 0 | 0 | * | 0 0 0 0 0 1 |
| 7097 | 0 | 0 | + | 0 0 0 0 0 1 |
| ⋮ | | | | |

DATA FLOW PROCESSOR WITH NEXT DESTINATION NODE DETERMINATION

BACKGROUND OF THE INVENTION

1. Field of the Invention

The present invention relates to a data flow processor adopting a system to drive processing on the basis of interdependence between the data to be processed.

2. Description of Related Art

Figure 1:
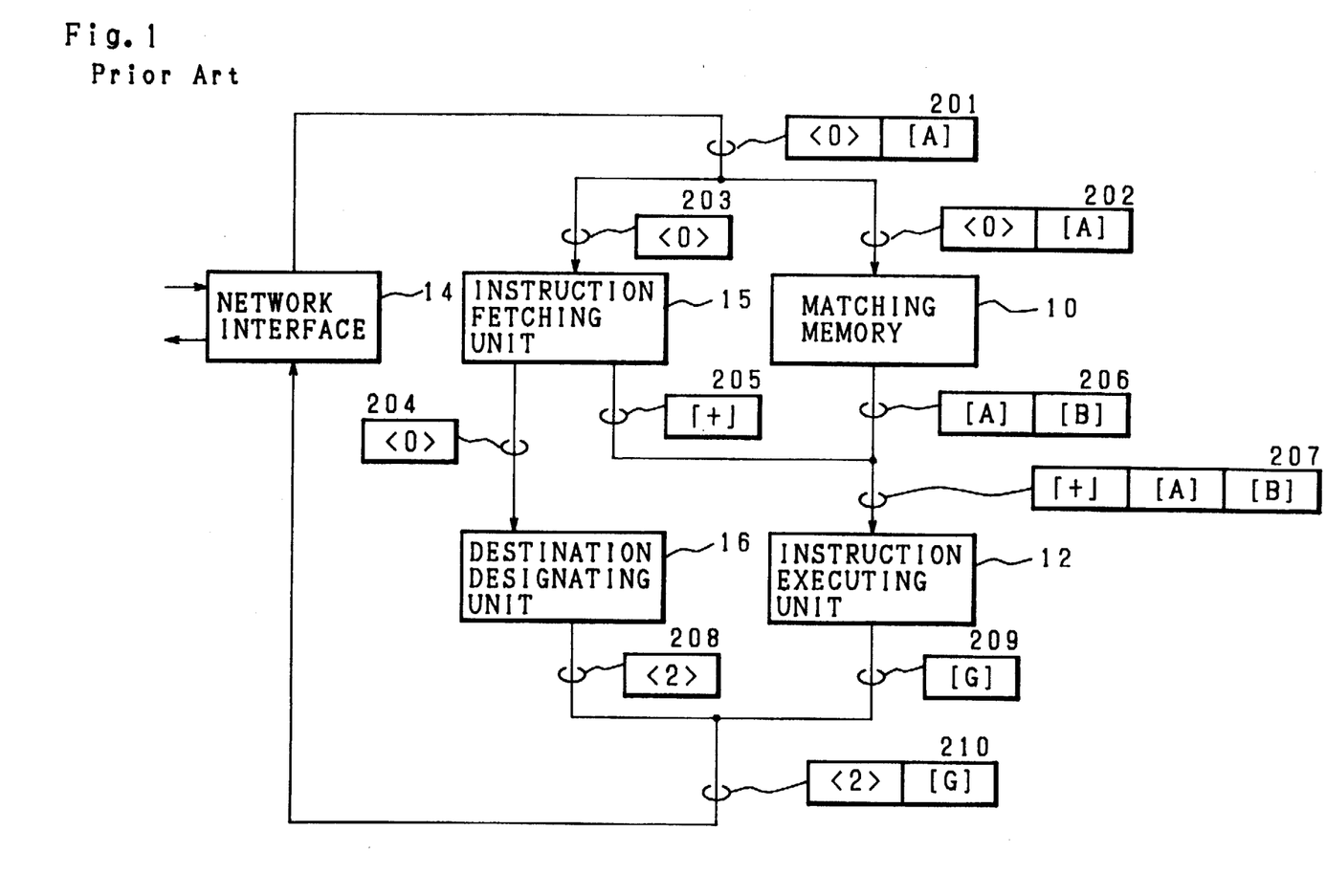
FIG. 1 is a block diagram exemplary of the conventional data flow processor.

A typical example of the conventional data flow processor is disclosed in Pages 19 to 22, digest of technical papers of lecture of Development Result Presentation Conference for Scientific Technique High Speed Computation System Research (Jun. 25, 1984) and Pages 486 to 490, digest of technical papers (in English) of IEEE COMPCON '84 SPRING. These public documents all describe construction and operation of the data flow processor called the Sigma-1. The prior art will be described on the basis of these public documents as follows:

FIG. 1 is a block diagram of the above-mentioned conventional data flow processor.

The data flow processor comprises a network interface 14 of interface with the exterior of the processor, a matching memory 10 for detecting from the data to be processed two data coincident with each other in the destination node number, an instruction fetching unit 15 for fetching the operation instruction code pointed by the node number, an instruction executing unit 12 for executing the processing in accordance with the instruction code, a destination designating unit 16 for designating the next destination node number of the data after processed, and data paths connecting therethrough these units.

Figure 2:
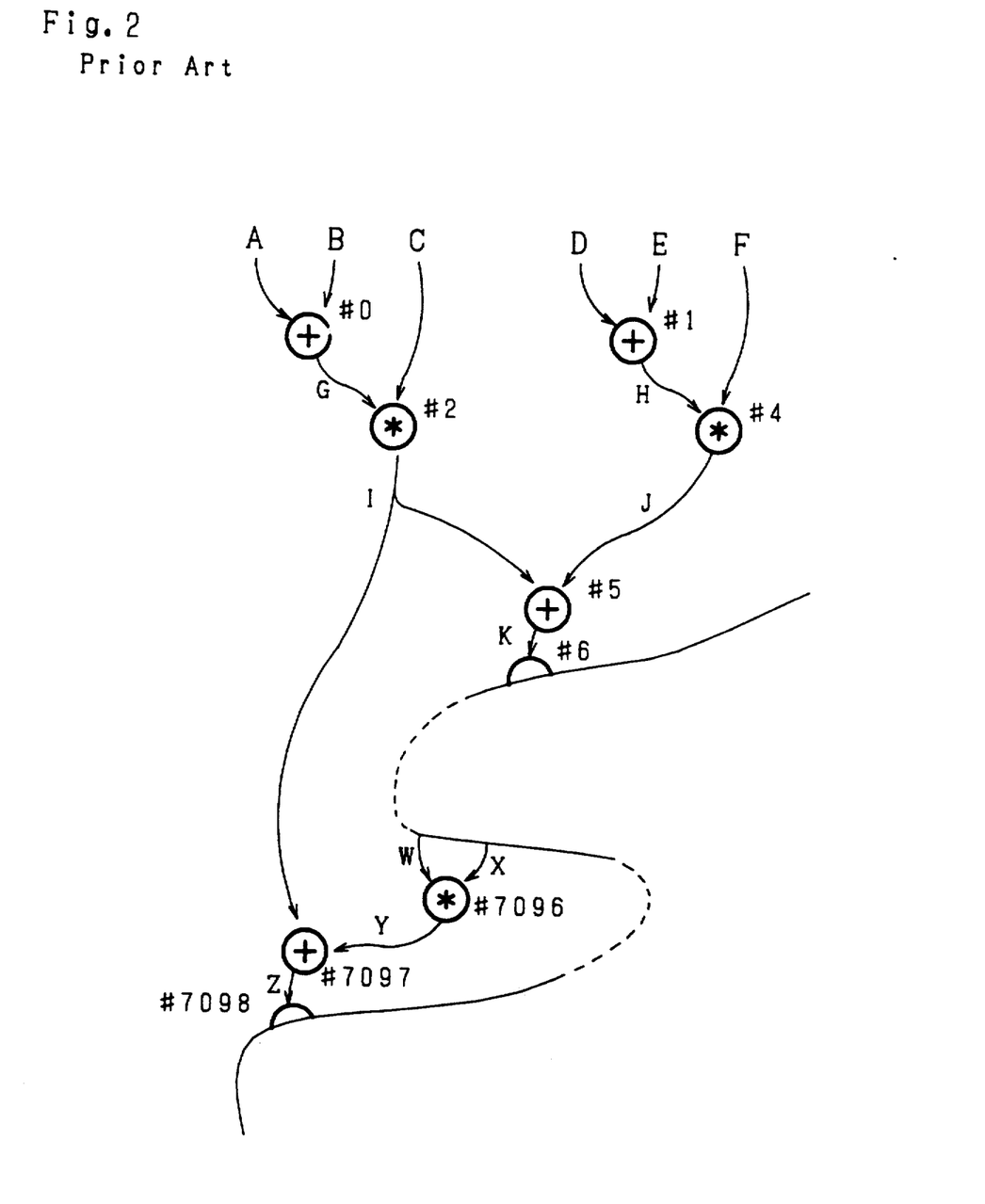
FIG. 2 is a typical view exemplary of a program (data flow graph) executed by the conventional data flow processor, showing the same program as FIG. 5 except for allocation of the node number.

FIG. 2 shows an example of a program (data flow graph) for explaining concrete operation of the conventional data flow processor.

The data flow graph is so constituted that data A and B are added at the node #0, the resultant data G is multiplied by another data C at the node #2 to obtain the resultant data I, while, data D and E are added at the node #1, the resultant data H is multiplied by another data F at the node #4 so as to obtain the resultant data J . . . , data W is multiplied by X at the node #7096, the resultant data Y and the previously obtained data I are added at the node #7097 so as to obtain the resultant data Z, and so on.

A packet A(201) (data having the tag information) inputted from the exterior through the network interface 14 comprises destination node number <0> and data [A]. The packet 201 is delivered to the matching memory 10, and simultaneously the destination node number <0> (203) in the packet 201 is sent also to the instruction fetching unit 15. Assuming that a packet B having data [B] of the object to the dyadic operation has already been inputted and waits in the matching memory 10, the destination nodes of the two packets A and B are coincident with each other at the node #0, so that the matching memory 10 outputs a packet 206 of a pair of data [A] and [B].

On the other hand, at the instruction fetching unit 15, an instruction code "+"(205) of the content of address corresponding to the node number <0> is read and outputted.

Figure 3A:
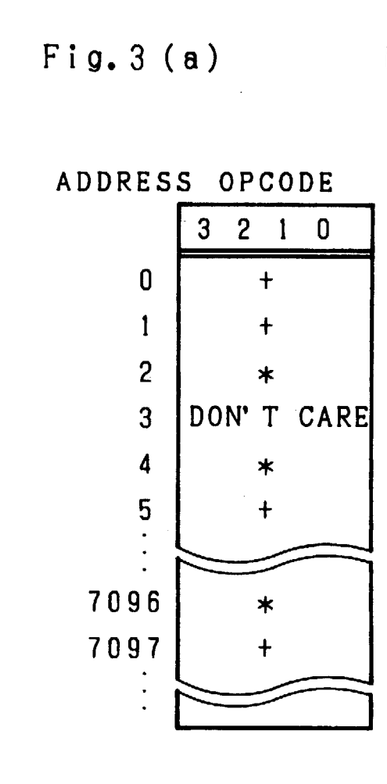
FIG. 3(a) is a configuration diagram of a memory at an instruction fetching unit at the conventional data flow processor.

Memory configuration of the instruction fetching unit 15 is shown in FIG. 3(a).

Next, the destination node number <0> inputted to the instruction fetching unit 15 is delivered intact to the destination designating unit 16 as the node number <0>(204). The instruction code "+"(205) read out at the instruction fetching unit 15 together with the packet 206 of data pair [A] and [B] is given as a packet 207 to the instruction executing unit 12, and at that time at the destination designating unit 16 is accessed and delivers the code <2>(208) representing the node #2 to which the resultant data of addition of operation corresponding to the node number <0> in the data flow graph shown in FIG. 2 is to be sent.

Figure 3B:
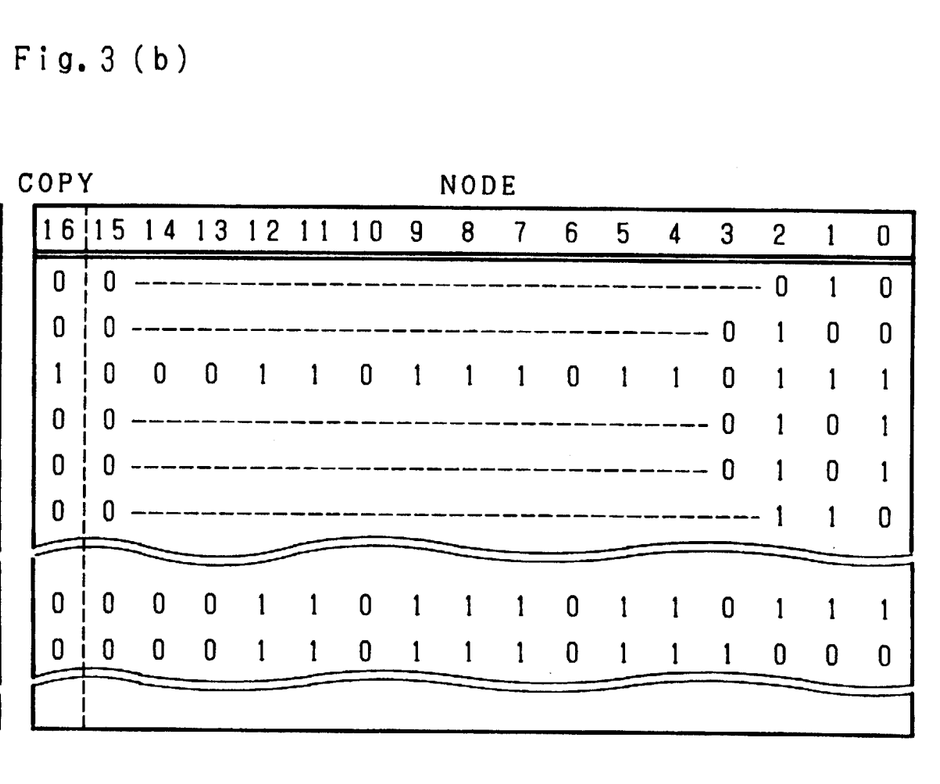
FIG. 3(b) is a typical configuration diagram of a memory at a destination designating unit, both FIGS. 3(a) and 3(b) showing the memory contents in the case where the program shown in FIG. 2 is stored.

Memory configuration of the destination designating unit 16 is shown in FIG. 3(b).

Simultaneously, the instruction executing unit 12 computes [A]+[B] and the operation resultant data [G](209) is outputted therefrom. The output 208 of the destination designating unit 16 and the output 209 of the instruction executing unit 12, in order words, the destination node number <2> and data [G], pass as a packet 210 through the network interface 14 and is sent again to the instruction fetching unit 15 and matching memory 10.

The aforesaid chain of processes executes operations corresponding to all the nodes of data flow graph shown in FIG. 2 and execution of program ends, and at that time the node where the relation of interdependence between data exists, for example, the processings at the nodes #0 and #2 are executable sequentially only in the order of the above. However, the node having no relation of inter dependence between data, for example, the processing at the nodes #0 and #1 is executable in parallel as far as the processing resource allows.

In addition, the relation of interdependence between data means that, in a relation between the two nodes, the processing at one node is completed so that input data required to process the other is supplied for the first time.

Memory configuration of the instruction fetching unit 15 and destination designating unit 16 are shown in FIG. 3(a) and FIG. 3(b). Since a bit width of each information is not clarified in the aforesaid public document, a bit width of instruction code is assumed to be 4 bits and that of destination node number to be 16 bits. Also, since the document does not concretely describe the data copy operation, the data copy is assumed to use a widely well-known method.

A most significant bit "COPY" in the memory within the destination designating unit 16 is copy bit, which, in the case where the operation result at the node in the data flow graph shown in FIG. 2 is sent to a plurality of nodes, executes the data copy to give the destination node number to each data. For example, the result of operation at the node #2 is sent to both the nodes #7097 and #5, so that a logical "1" is stored in a second address copy bit in the memory corresponding to the result. In this case, the destination node number #7097 is read and concatenated to the result of operation [1] and outputted, and thereafter the next address (a third address) is continuously read and then the destination node number #5 is concatenated to the same result of operation [1] and outputted.

The aforesaid conventional data flow processor has a problem in that the size of program memory is larger.

A von Neumann type computer now widely used carries out processing sequentially in the order described in the program, whereby one register so called the program counter manages executing addresses in a unifying manner. Accordingly, the address of the next instruction (jump address) to be executed except for a branch instruction need not be particularly designated, and the size of program memory smaller than the data flow processor can store program of the same contents. On the contrary, in a case of data flow processor, since the respective instructions are processed in parallel, it is impossible to manage the executing address in a unifying manner. Therefore, the data flow processor is essentially required to designate address of instruction to be next executed (destination node number) with respect to all the instructions, which causes size of program memory to be enlarged. In the aforesaid conventional example, 16 bits among 21 bits (instruction code 4 bits + destination node number 17 bits) in bit width per one instruction are occupied by the destination node number.

SUMMARY OF THE INVENTION

In the light of the above problem, the present invention has been designed. A main object thereof is to provide a data flow processor which contracts size of the program memory so as to expect reduction in the hardware size of the same and simultaneously to expect an improvement in performance by contracting a memory access time following the contraction of the size of memory.

The data flow processor of the invention has structure to store the destination node number in the program memory at, for example, relative address (dislocation) from the stored address of the present instruction. Such structure can obtain stored address for the next instruction by processing of adding the relative address of the next instruction to the address of present instruction, thereby contracting the size of program memory.

The above and further objects and features of the invention will more fully be apparent from the following detailed description with accompanying drawings.

DESCRIPTION OF THE PREFERRED EMBODIMENTS

Next, an embodiment of a data flow processor of the invention will be detailed in accordance with the accompanying drawings.

Figure 4:
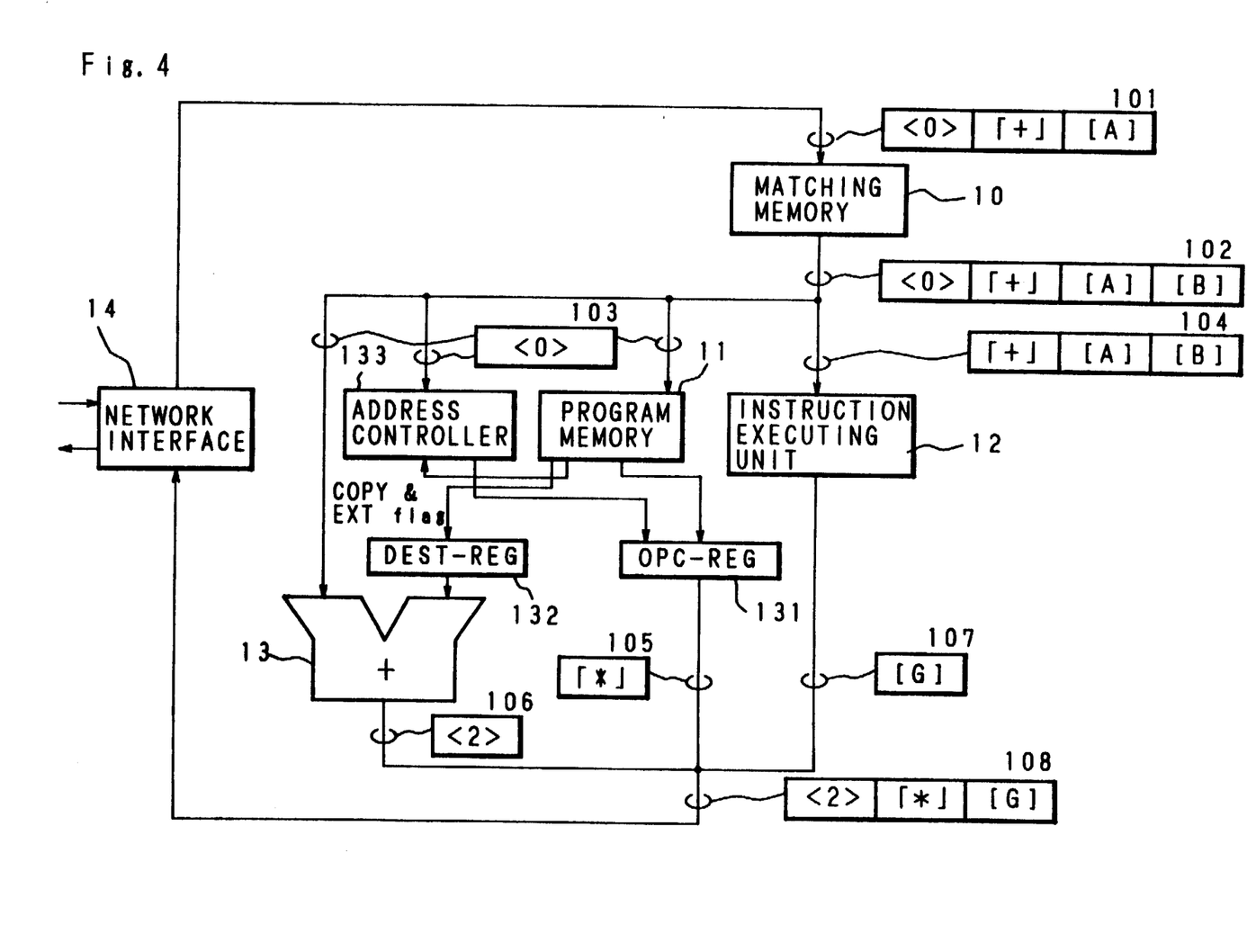
FIG. 4 is a block diagram of an embodiment of a data flow processor of the invention.

FIG. 4 is a block diagram of an embodiment of a data flow processor of the invention.

The data flow processor of the invention comprises a network interface 14 of interface to the exterior, a matching memory 10 as a coincidence detecting unit for detecting from data to be processed two data coincident with each other in the destination node number, a program memory 11 having two functions of fetching the operation instruction code pointed by the node number and of designating the next destination node number of data after the processing, an instruction executing unit 12 as a processing unit, for executing the processing in accordance with the instruction code, an adder 13 as operation means for updating the destination node number, and data paths for connecting these components.

Figure 5:
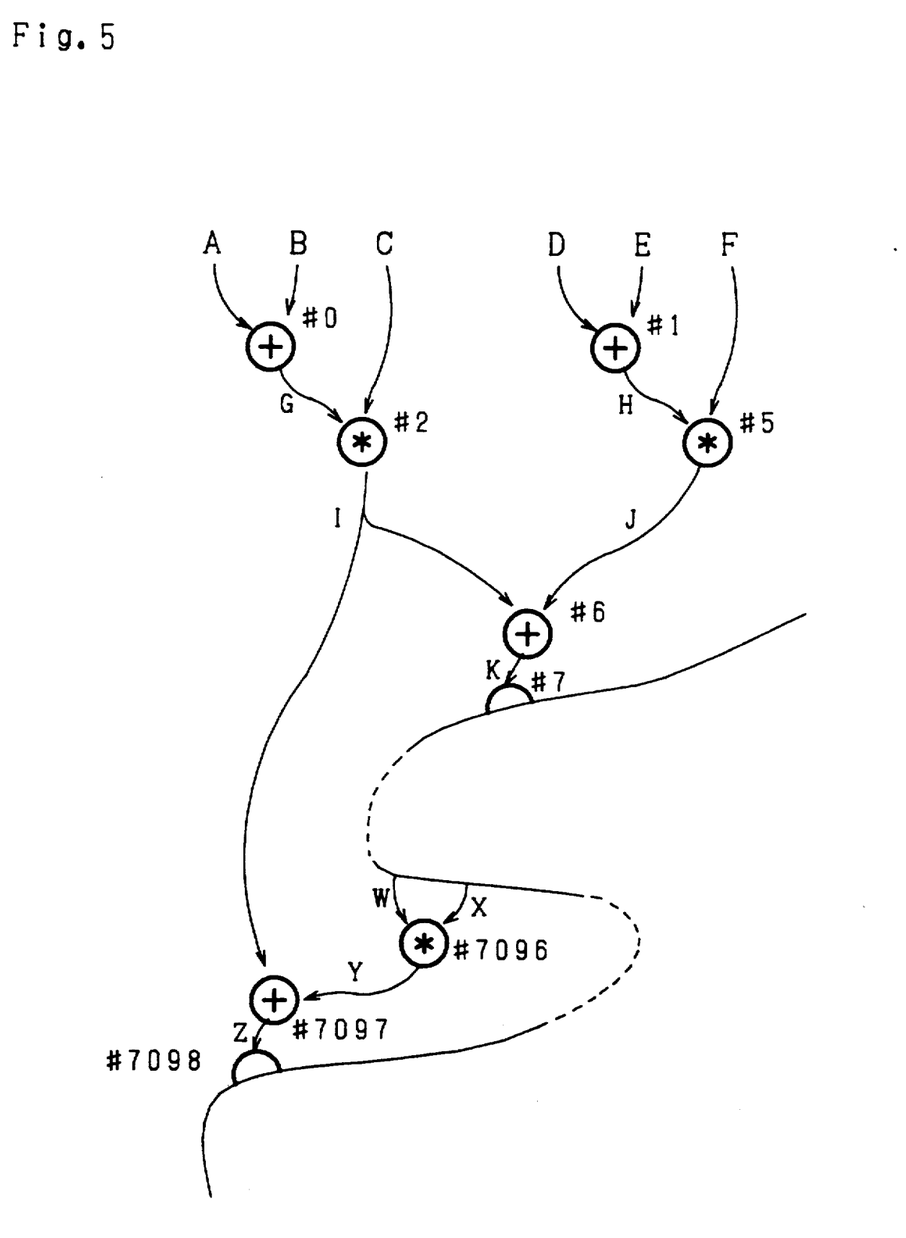
FIG. 5 is a typical view exemplary of a program (data flow program) executed by the data flow processor of the invention.

Next, explanation will be given in the case where the data flow processor of the invention executes the program (data flow graph) in FIG. 5. In addition, the data flow graph shown in FIG. 5 is quite the same as that in FIG. 2, but different therefrom in allocation of the node number for the convenience of explanation of the invention.

The data flow graph is so constructed that data A and B are added at the node #0, the resultant data G is multiplied by another data C at the node #2 so as to obtain the resultant data I, on the other hand, data D and E are added at the node #1, the resultant data H is multiplied by another data F at the node #5 so as to obtain the resultant data J . . . , data W is multiplied by data X at the node #7096, the resultant data Y and the previously obtained data I are added at the node #7097 so as to obtain the resultant data Z . . . .

A packet 101 inputted from the exterior through the network interface 14 includes the destination node number <0>, data [A] and an instruction code "+".

The data flow processor of the invention carries out pipeline processing of two cycles. A first stage thereof is data queuing at the matching memory 10. The packet 101 inputted from the exterior is sent to the matching memory 10, and at that time, in the case where a packet including data [B] objective to the dyadic operation does not yet arrive, the inputted packet 101 is temporarily stored in the matching memory 10 and waits arrival of packet including data [B]. Unlikely, in the case where another packet including data [B] arrives and is stored in the matching memory 10, the destination node numbers <0> of the two packets are detected to be coincident with each other, so that a packet 102 adding data [B] to the input packet 101 is delivered from the matching memory 10.

The destination node number <0>(103) among the information included in the packet 102 is delivered to the program memory 11 and an adder 13 to be discussed below, the residual data [A] and [B] and instruction code "+" are delivered as a packet 104 to the instruction executing unit 12.

At the instruction executing unit 12, the data [A] and [B] are added in accordance with the instruction code "+" so that the addition resultant data [G](107) is outputted.

Figure 6:
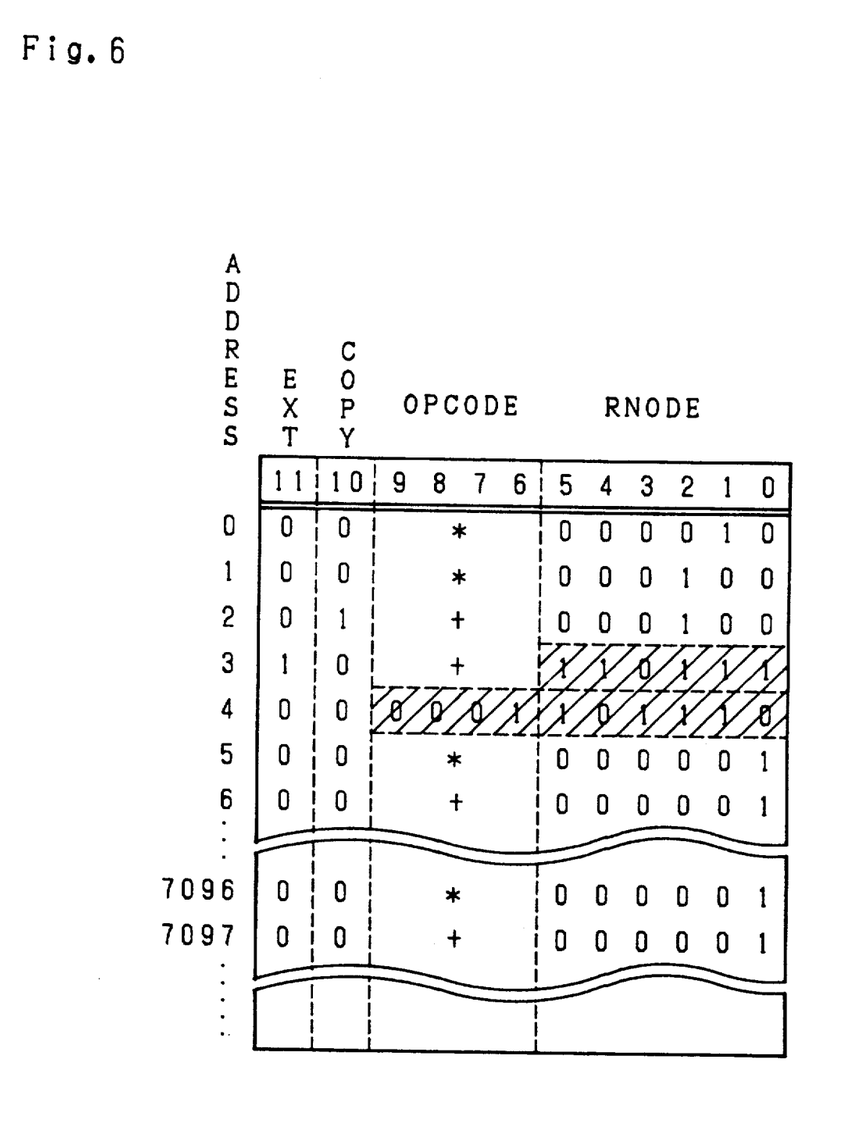
FIG. 6 is a typical view showing memory configuration of program of the data flow processor of the invention, and more concretely the memory content in the case where the program in FIG. 5 is stored.

On the other hand, processing at the program memory 11 to be executed in parallel to the processing at the instruction executing unit 12 will be described as follows:

Referring to FIG. 6, the memory configuration of program memory 11 at the data flow processor of the invention is shown.

In the memory in FIG. 6, the most significant bit "EXT" of each word is an extended addressing flag to be discussed below.

Bit "COPY" in low order thereof has the same meaning as "COPY" bit in the conventional one. When "COPY" bit is a logical "1", there are a plurality of destination nodes of operation result, which represents that the instruction code regarding each destination node and the information of destination node number are stored in the next address on and after.

An instruction code (OPCODE) to be executed at the next cycle are stored in 4 bits in low order following the "COPY" bit, and destination node number at the relative address (RNODE) with respect to the present node number is stored in 6 bits in further low order.

Concrete operation of the data flow processor of the invention as above-mentioned will be described.

When the packet 101 is coincidence-detected at the matching memory 10 and the packet 102 is outputted, the node number <0>(103) of packet 102 is inputted to the program memory 11. Therefore, the 0 address of memory shown in FIG. 6 is accessed and the instruction code "*" and relative destination node number <2> are read, thereby being written in the instruction code register (OPC-REG) 131 and destination node number register (DEST-REG) 132 respectively.

The instruction code is outputted intact from the instruction code register 131. On the other hand, the relative destination node number <2> is delivered from the destination node number register 132 to the adder 13 and added thereby to the previously inputted node number <0>(103) to thereby obtain the absolute value <2>(106) of the destination node number.

A packet 108 constituted of the instruction code "*" thus obtained, destination node number <2> and data [G] outputted from the instruction executing unit 12, is again supplied to the matching memory 10 through the network interface 14. Such processing is repeated to execute the entire program.

The present invention, however, limits to 6 bits the bit width of program memory 11 for storing the relative destination node number, whereby when a value of actual relative destination node number exceeds 255 ($=2^6-1$), an overflow occurs.

For example, in the data flow graph in FIG. 5, the relative destination node number corresponding to the arrow from the node #2 to the node #7097 corresponds to the aforesaid overflow. In such case, the present invention is so constituted that the significant bit "EXT" of program memory corresponding to each node number is a logical "1", whereby the next address is usable as the extended addressing bit area for storing the overflowed digits.

Next, explanation will be given on the case where the input data [G] and [C] required for processing at the node #2 in FIG. 5 are arranged so that the packet comprising the destination node number <2>, instruction code "*" and data [G] and [C], is outputted from the matching memory 10.

As the above-mentioned, the instruction code and data are sent to the instruction executing unit 12 and they are multiplied by each other and the resultant data [I] is outputted. In parallel thereto, the destination node number <2> is sent to the program memory 11 and the destination node number is read out. A flow chart in FIG. 7 shows detailed logical operation of program memory 11 when the inputted node number is <N>.

Figure 7:
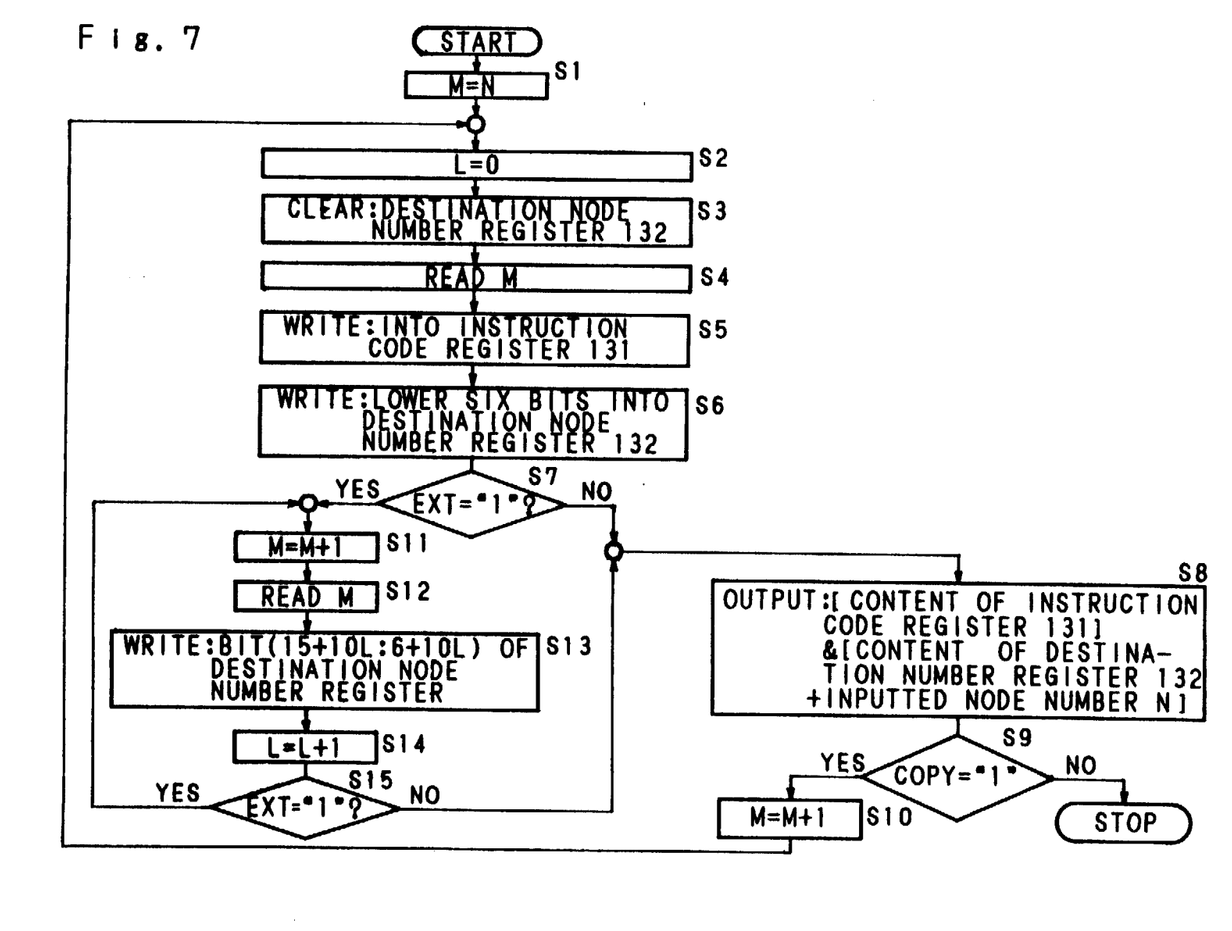
FIG. 7 is a flow chart showing a detailed procedure at the program of the data flow processor of the invention.

The routine depicted in FIG. 7 is performed by an address controller 133 which receives the EXT and COPY bits from the program memory and controls the memory and OPC-REG 11 and 131.

In the flow chart, "READ M" represents reading operation for M address of the memory; bit (5:0) and the like, a bit array composed of bits 5 to bit 0; and "EXT" and "COPY", values of the extended addressing flag bit and of the copy flag bit respectively.

When the packet having the destination node number <2> is inputted to the program memory 11, the content of the second address of program memory is read (in a step S4). Within the read-out contents, the instruction code "+" is written in the instruction code register 131 and the relative destination code number <4> into the least significant 6 bits, that is, the bits (5:0), of the destination node number register 132 respectively (in steps S5 and S6).

The "EXT" bit or readout word is a logical "0" (in step S7), whereby the result <6> of adding the value <4> of the destination node number register 132 and the inputted node number <2> by the adder are outputted as the revised destination node number (in step S8). The revised destination node number is concatenated with the output of OPC-REG 131 and IEU 12 to form the revised output packet 108.

At this time, since the "COPY" bit of readout word is a logical "1", the readout address <2> is incremented (in a step S10), the loop count <L> and the content of destination node number register 132 are cleared (in steps S2 and S3), and thereafter the third address of address after incremented is read-out (in a step S4).

In the same way as the first readout the instruction code "+" and the relative destination node number <55>(="110111") among the readout words are written in the least significant 6 bits of the instruction code register 131 and destination node number register 132 respectively (in steps S5 and S6). Since the "EXT" bit is a logical "1" (in a step S7), the readout address is incremented (in a step S11) to read the contents of the fourth address and the least significant 10 bits of the readout words are written in the bit 6 from the bit 15 of the destination node number register 132 (in a step S13). Since a value of "EXT" bit of the lastly readout word is a logical "0" (in a step S15), the present instruction code "+", and the addition result <7097> of the content <7095> of destination node number register 132 (="0001 1011 1011 0111") and the input node number #2, are outputted.

Since the value of the last readout word of COPY bit is a logical "0" (in a step S9), the process with respect to the inputted packet having the node number <2> end.

As mentioned above, in a case where the destination node number is given by the relative destination node number, even when the relative destination node number overflows beyond the predetermined bit width, the next address of program memory is used as an extended addressing area for the relative destination node number, thereby completing the processing. The present invention is applicable to the program of any size and any number allocation.

Generally, since connections among nodes are localized, it is considered that the relative destination node number is independent of program size, and seldom takes a large value. Actually, when the node number is so allocated that a smaller node number is given sequentially to a nearer node from the input with respect to the test program of 3987 nodes, it is valued that what statistical distribution the relative destination node number shows. The result thereof is shown in the FIG. 8 graph, in which the axis of abscissa shows the relative destination node number, the axis of ordinate percentage of cumulative frequency, and numerals with respect to the respective sections show the number of nodes included therein.

Figure 8:
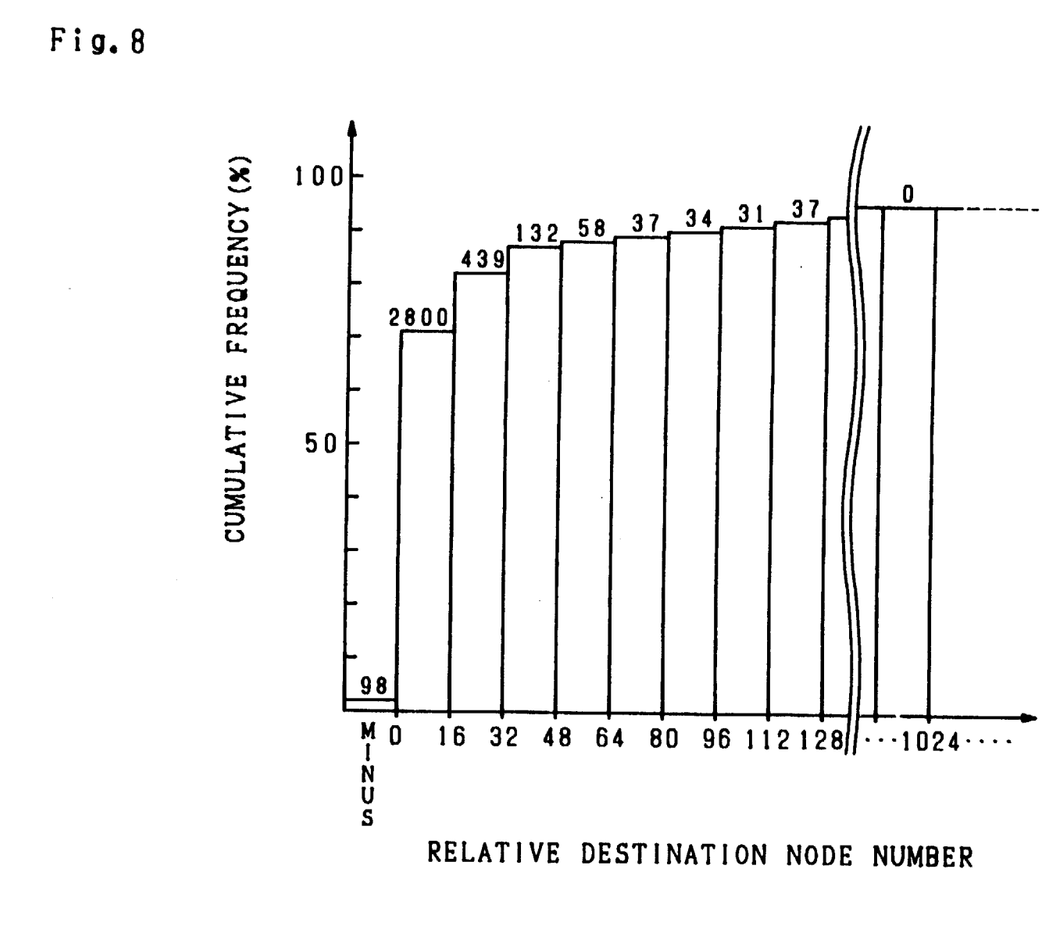
FIG. 8 is a graph showing distribution of values of the relative destination node number.

It is easy to understand from the FIG. 8 graph that about 88% of the entire relative destination node numbers are within 63 addresses. In other words, it is meant that even when a bit width of relative destination node number is assumed to be 6 bits, the possibility of requiring the extended bit as above-mentioned is about 10%.

While the conventional program memory has bit width of 21 bits (4 bits of instruction fetching unit and 17 bits of destination designating unit), 12 bits of the embodiment of the invention is. Hence, even when the number of words required in surplus for storing the extended addressing for execution of the present invention is about 10% according to the aforesaid statistics, the size of memory is contracted to a equation of $(12 \times 1.1)/21 \approx 0.63$. In the embodiment, a space of program memory is of 16 bits, the contraction effect being further remarkable when the program memory space becomes larger. For example, in the case where the program memory space is assumed to be 32 bits, even when the space of relative destination node number is extended to 8 bits and a ratio required by the extended addressing bit is estimated to be 20%, the memory size is given in $$\frac{\text{(Relative Destination Number + Flag + Instruction Code)} \times 1.2}{\text{(Destination Node Number + Flag + Instruction Code)}}.$$

When an actual bit number is substituted, it is multiplied by $$\frac{(8 + 2 + 4) \times 1.2}{(32 + 1 + 4)} \approx 0.45,$$

which is contractible under a half.

In addition, the above embodiment defines the relative destination node number to be the positive numeral for simplification of description, but it is possible by using signed numeral (represented by two's complement) to send out data with respect to the node having a smaller node number than the node number at the output side. Hence, the present invention is applicable even for the program including loop structure.

Furthermore, in this embodiment, the overflow bit of relative destination node number is allocated to the extended bit, but other methods may be used. For example, the program may be divided in unit of page, the address in the page is represented by, for example, 6 bits, and when the destination node exists beyond the page, it is possible to adopt the method of allocating relative page number to the extended bit.

Also, in the aforesaid embodiment, the instruction fetching unit and destination designating unit at the conventional example of data flow processor are united into a single program memory, and the program memory is disposed in parallel to the instruction executing unit, whereby the redundant input address latch and the decoder or the like are omitted to reduce hardware size.

Thus, the program memory and instruction executing unit are disposed in parallel to each other, whereby a processing latency for executing one instruction comprises two pipeline stages of ①  processing at the matching memory, and ② processing at the "program memory + instruction executing unit". Hence, a short processing latency not inferior to the conventional data flow processor is obtained. Hence, the response time with respect to a single instruction can be reduced.

As seen from the above, in the data flow processor of the present invention, the destination node number in the program memory is designated by, for example, the relative address from the stored address of the present instruction, whereby the bit width for storing the destination node number is largely reduced, thereby enabling the size of program memory to be reduced.

Generally, the data flow processor is constructed on a computation model suitable for parallel distribution processing and considered to have the prominent characteristic that the multitasking is autonomously executed in parallel without applying special control. However, in the case of the existing method which statically decides the address of program memory for storing therein the respective multitaskings, the task Ta (see FIG. 9) now under execution and another task Tb having a fear of having in common the region of program memory cannot simultaneously be executed even when the program memory has a vacant region. Accordingly, in fact, the existing data flow processor cannot fully utilize its essential characteristic suitable for the multitasking.

On the contrary, in the data flow processor of the invention, since the node number of all the nodes is designated by the relative destination node number from other node, if a vacant region exists in the program memory, new tasking can be loaded from the exterior on a desired vacant region regardless of the absolute address, thereby being executed in parallel to other tasks.

Figure 9:
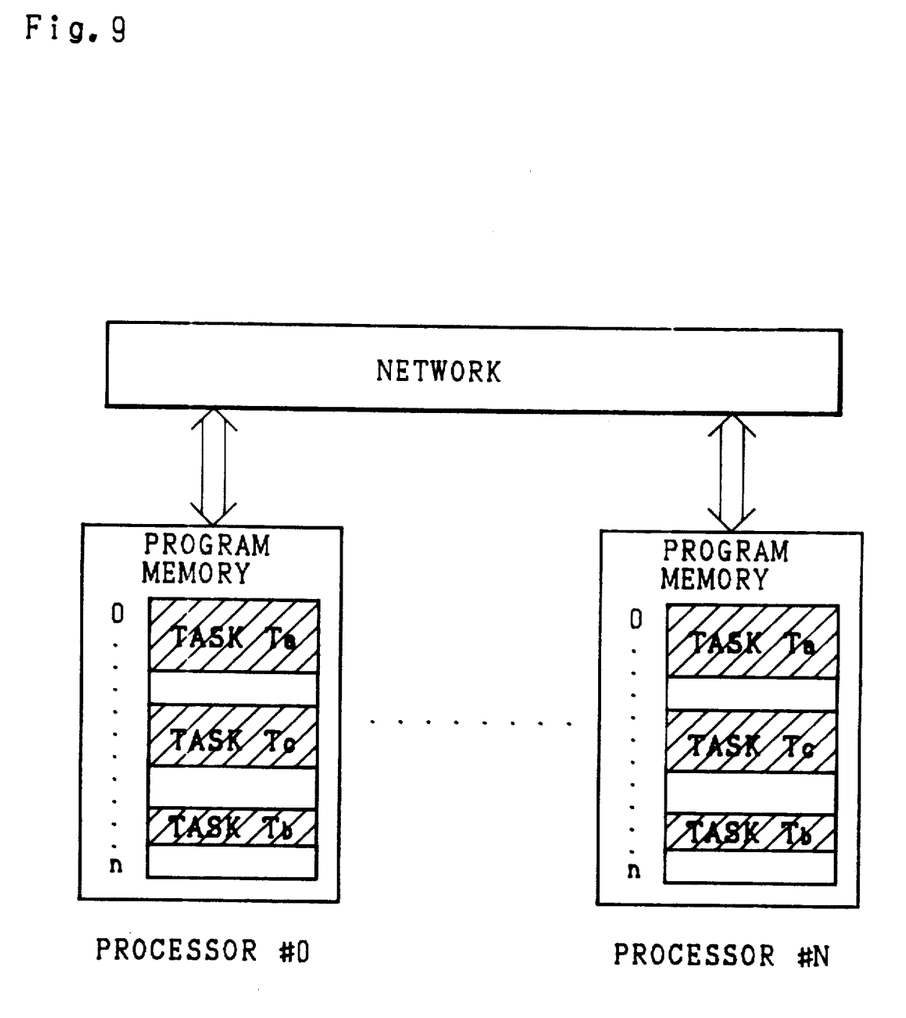
FIG. 9 is a schematic representation of a map of program memory at the running state of multitasking at a multiprocessor constitution.

The above describes execution of multitasking on one processor, wherein as shown in FIG. 9, a construction is considered, in which a plurality of data flow processors #0 to #N are connected through a network. In this construction, when the respective tasks Ta, Tb and Tc across each processor are to occupy the same program memory in each processor, even for the multiprocessor performing packet-communication with each other through the network, the execution of multitasking and task generation can be carried out, whereby the high speed parallel distribution processing using the plural data flow processors is realizable with ease.

In addition, it is obvious that this invention is applicable for a multiprocessor configuration in which a large and continuous program address space is formed by plurality of data flow processors.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data flow processor for processing a stream of packets, wherein each packet in the stream comprises a data element and a destination node number, and wherein new packets are created and added to the stream by the data flow processor, comprising:

a matching memory, capable of storing a plurality of packets from the stream of packets;

means for accepting a packet from the stream of packets and for storing said packet into said matching memory;

matching means for matching a first packet stored in said matching memory and a second packet stored in said matching memory, where said first packet and said second packet each comprise matching destination node numbers;

packet output means, coupled to said matching means, for outputting said first packet and said second packet as a two-element packet, said two-element packet comprising a destination node number equal to said matching destination node numbers, an operation code matching an operation code field within at least one of said first packet and said second packet, a first data element matching said data element of said first packet, and a second data element matching said data element of said second packet;

a processing unit, having an input for receiving, from said packet output means, said first data element, said second data element, and said operation code of said two-element packet, said processing unit including an output which outputs a result element, said result element being a result of an operation on said first data element and said second data element, said operation being determined by said operation code;

a program memory, having an address input for receiving, from said packet output means, said destination node number of said two-element packet, said program memory comprising storage locations for relative node values and next operation codes and an output for outputting a relative node value and a next operation code corresponding to said destination node number of said two-element packet; and operation means, coupled to receive said destination node number of said two-element packet from said packet output means and said relative node value from said program memory, for executing a predetermined operation on said relative node value and said destination node number, said predetermined operation generating a next destination node number, wherein the new packet is created and comprised said next destination node number, said result element, and said next operation code.

2. A data flow processor as set forth in claim 1, wherein said relative node value is a relative address of said next destination node number relative to said destination node number of said two-element packet and said predetermined operation is addition.

3. A data flow processor as set forth in claim 2, wherein said relative node value is a bit field of predetermined length and the data flow processor further comprises:

extension storage locations in said program memory for storing extension values, where an extension value indicates whether a corresponding relative node value fully indicates a next destination node number;

a plurality of offset locations in said program memory for storing bit fields corresponding to destination node numbers; and means, responsive to an extension value corresponding to a given destination node, for concatenating bit fields in more than one of said plurality of offset locations to form said next destination node number if said extension value indicates that said next destination node number is not fully indicated by said corresponding relative node value.

4. A data flow processor as set forth in claim 1, wherein said processing unit begins said operation on said first data element and said second data element before said program memory outputs an operation code corresponding to said destination node number.

5. A data flow processor as set forth in claim 1, wherein the data flow processor is attached to a network, said network carrying data packets from the data flow processor and other data flow processors and supplying said carried data packets to the data flow processor and said other data flow processors, said network forming a parallel processing system where multiple data flow processors accept packets from said network and output data packets to said network, and wherein said network is coupled to receive the new packet created by the data flow processor and wherein said network is also coupled to provide data packets to said means for accepting packets.

* * * * *